Aug. 16, 1932.    H. T. WOOLSON    1,872,546

OIL PAN

Filed May 29, 1926

Inventor
Harry S. Woolson

By
Irving Harness
Attorney

Patented Aug. 16, 1932

1,872,546

UNITED STATES PATENT OFFICE

HARRY T. WOOLSON, OF DETROIT, MICHIGAN, ASSIGNOR TO CHRYSLER CORPORATION, OF DETROIT, MICHIGAN, A CORPORATION OF DELAWARE

OIL PAN

Application filed May 29, 1926. Serial No. 112,455.

It is the primary object of my invention to provide a trap in an oil pan of an internal combustion engine to catch and hold on the bottom of the pan the sediment and grit usually present in oil.

Another object of my invention is to construct a cheap and economical sediment trap that can be easily secured adjacent the bottom of an oil pan of an internal combustion engine without interfering with the circulation of oil.

With the above and other objects in view, my invention consists in the arrangement, combination and construction of the various parts of my improved device, as described in the specification, claimed in my claims and shown in the accompanying drawing, in which:

Figure 1:
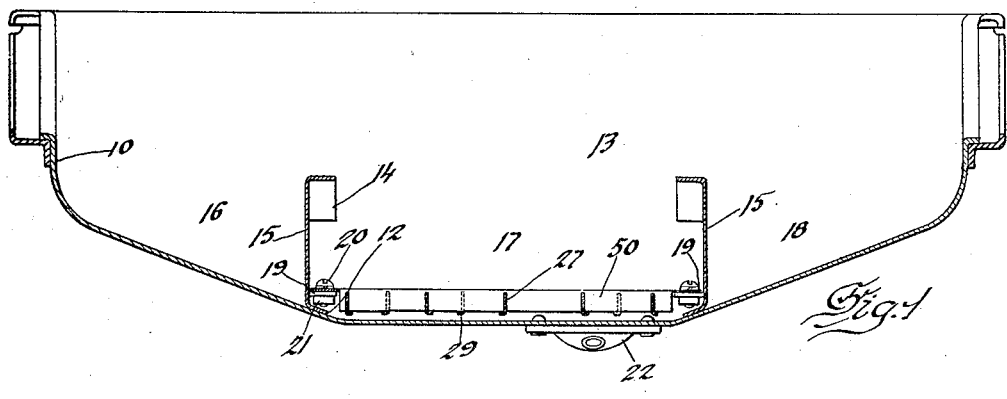
Fig. 1 is a longitudinal sectional view of an oil pan showing my improved device secured therein.
Figure 2:
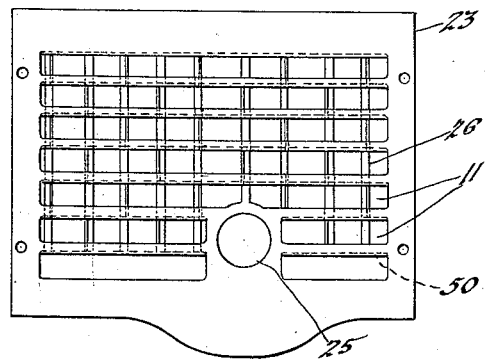
Fig. 2 is a plan view of my improved device.
Figure 3:
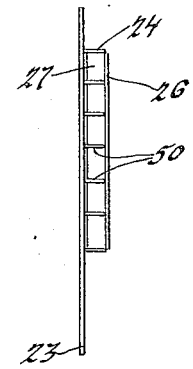
Fig. 3 is an end view of my improved device.

I have shown a conventional oil pan 10 for an internal combustion engine. Secured to the bottom of the pan 10 by flanges 12 and to the sides 13 by flanges 14 are vertical plate members 15 that divide the pan 10 into three separate compartments, 16, 17 and 18. The plates 15 have flanges 19 extending horizontally into the center compartment 17 adjacent the bottom of the pan and secured to these flanges by bolts 20 and nuts 21 is my improved device. Also placed in the bottom of the pan is a conventional drain plug 22.

In the construction of my improved trap I provide a plate 23 having evenly spaced elongated apertures 11 punched therein so that the punched out portions 50 of the plate extend downwardly and form baffle plates. An aperture 25 is also cut into the plate 23 to provide a clearance for a conventional oil pump, not shown.

Secured between the first and last baffle plates 50 and extending across the remaining baffles are evenly spaced transverse members 26 having vertical flanges or baffles 27. The transverse baffles 27 are arranged to extend upwardly into alternate recesses between the baffles 50 to form therewith elongated cells 28. To strengthen the members 26 the bottom edge thereof is bent over as at 29, shown in Fig. 1.

In the practical use of my improved trap when the internal combustion engine is not running the dirt and fine sediment in the oil drops through the cell formations in the plate 23 and settle on the bottom of the pan. Upon starting the engine the plate 23 and the baffles 50 and 27 tend to prevent the oil on the bottom of the compartment from splashing or otherwise stirring up the sediment so that the foreign matter will not enter the oil circulatory system of the engine.

It will be obvious that various changes may be made in the arrangement, combination and construction of the various parts of my improved device, without departing from the spirit of my invention and it is my intention to cover by my claims such changes as may be reasonably included within the scope thereof.

What I claim is:

1. In combination, an oil pan for an internal combustion engine, a plate having punched out portions forming downwardly extending baffles integral therewith positioned in and adjacent the bottom of said pan and transverse members having baffles extending up into alternate recesses between said first mentioned baffles secured to said plate.

2. In combination, an oil pan for an internal combustion engine, vertical plates positioned in said pan dividing the same into a plurality of compartments, a horizontal plate having punched out portions forming downwardly extending baffles integral therewith, means positioning said latter plate in the central compartment, adjacent the bottom of said pan, an aperture in said horizontal plate, and transverse members having baffles extending up into alternate recesses of said first mentioned baffles secured to said horizontal plate.

3. In combination, an oil pan for an internal combustion engine, a plate positioned in said pan and means secured to said plate for collecting foreign matter from the oil in the pan and segregating the same in the bottom of the pan, said means comprising a plurality of cells arranged in longitudinal and transverse rows.

4. In combination, an oil pan for an internal combustion engine, a stamped plate having downwardly extending flanges arranged in parallel longitudinal rows, and a plurality of stamped ribs cooperating with the downwardly extending flanges and arranged in parallel transverse rows to provide a cellular device.

HARRY T. WOOLSON.